Sept. 5, 1944.　　　　P. M. MUELLER　　　　2,357,780
MOLD AND MOLDING APPARATUS
Filed April 22, 1942　　　3 Sheets-Sheet 1

Inventor:
Paul M. Mueller
by Emery Booth Townsend Miller & Neidner
Attys.

Sept. 5, 1944. P. M. MUELLER 2,357,780
MOLD AND MOLDING APPARATUS
Filed April 22, 1942 3 Sheets-Sheet 2

Inventor:
Paul M. Mueller,
by Emery, Booth, Townsend, Mueller & Weidner
Attys.

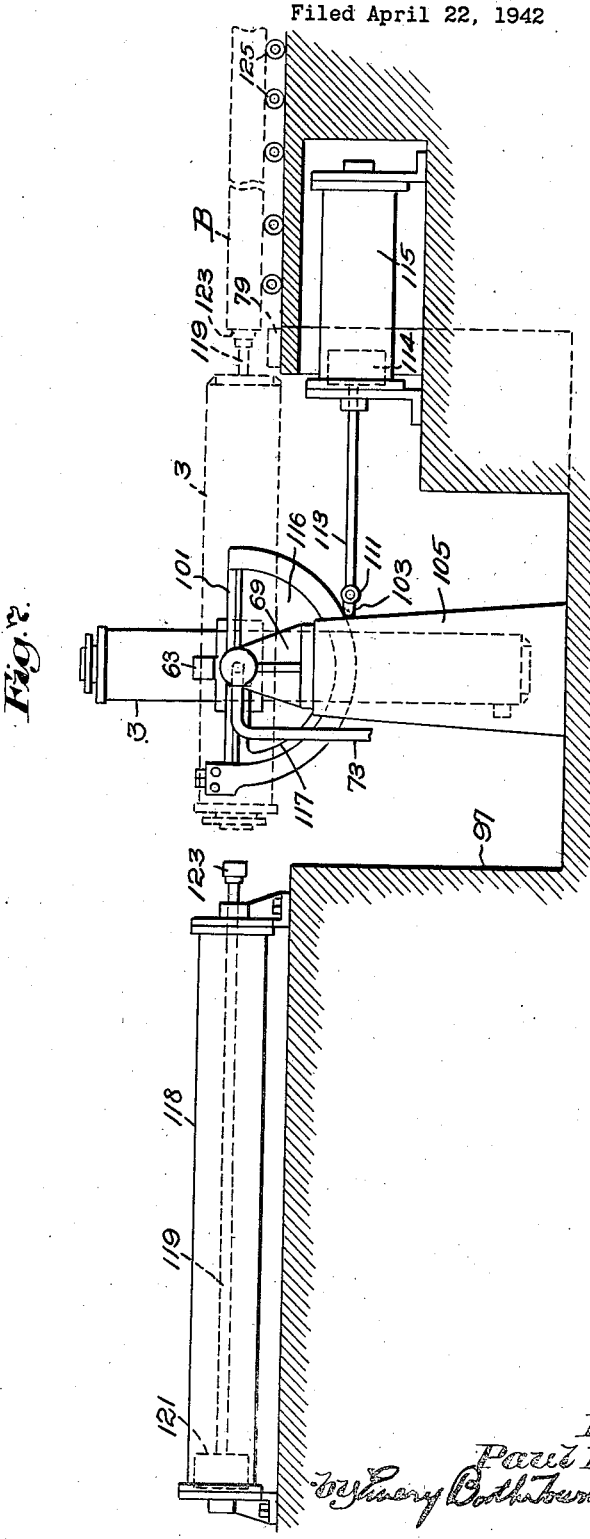

Patented Sept. 5, 1944

2,357,780

UNITED STATES PATENT OFFICE 2,357,780

MOLD AND MOLDING APPARATUS

Paul M. Mueller, Rome, N. Y., assignor to Revere Copper and Brass Incorporated, Rome, N. Y., a corporation of Maryland Application April 22, 1942, Serial No. 439,998

18 Claims. (Cl. 22—144)

My invention relates to molds and molding apparatus particularly, but not exclusively, for use in casting elongated billets of copper and its alloys.

The invention, which has among its objects the provision of a water cooled mold into which the molten metal may be readily poured and from which the casting may be readily removed, will be best understood from the following description when read in the light of the accompanying drawings of a specific embodiment of the invention selected for illustrative purposes, while the scope of the invention will be more particularly pointed out in the appended claims.

Figure 1:
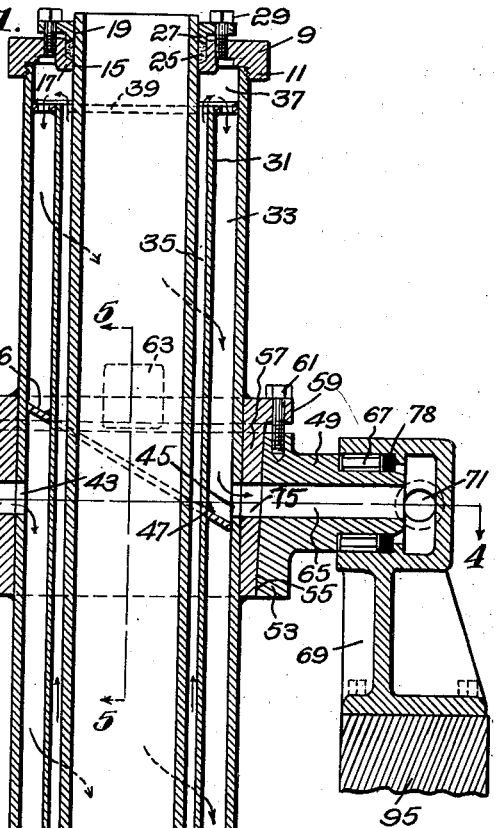
Fig. 1 is a longitudinal section of a mold and its mounting according to the invention.
Figure 3:
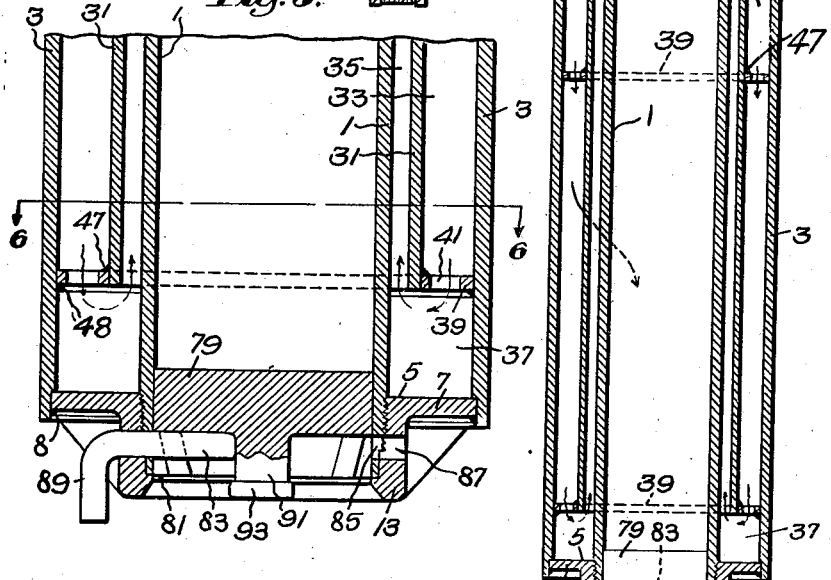
Figure 4:
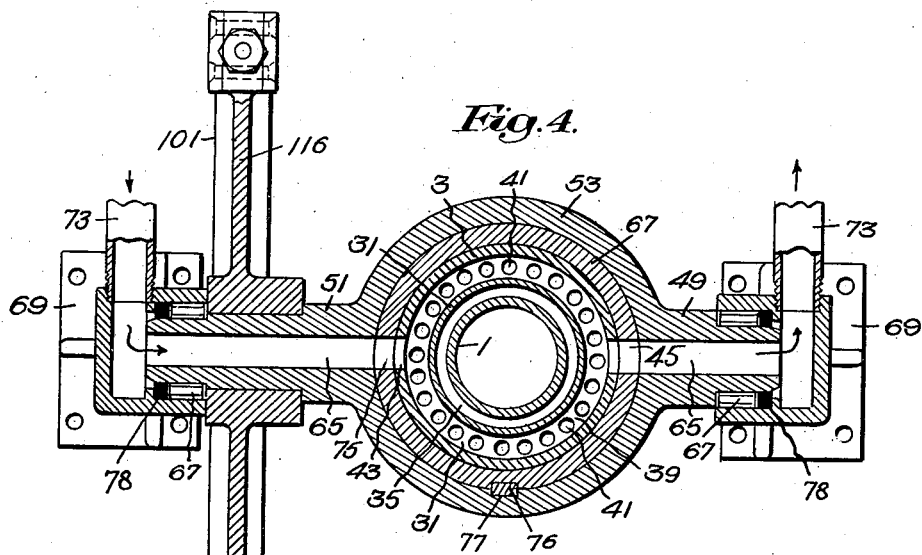
Figure 5:
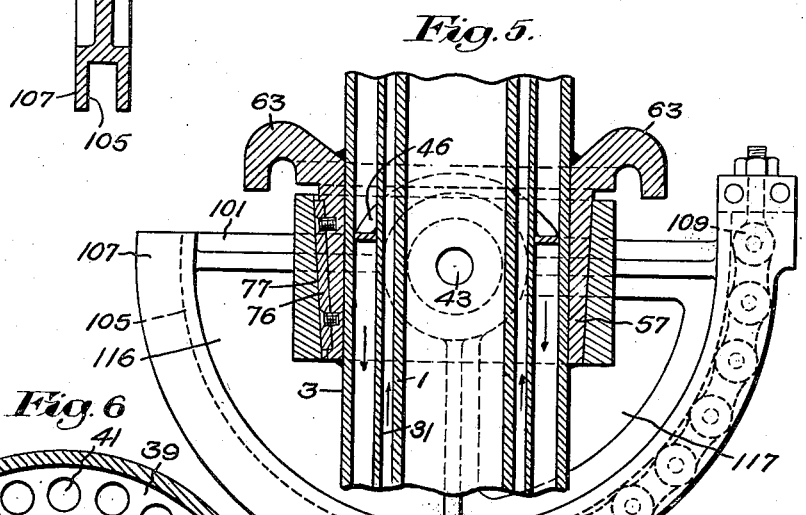
Figure 6:
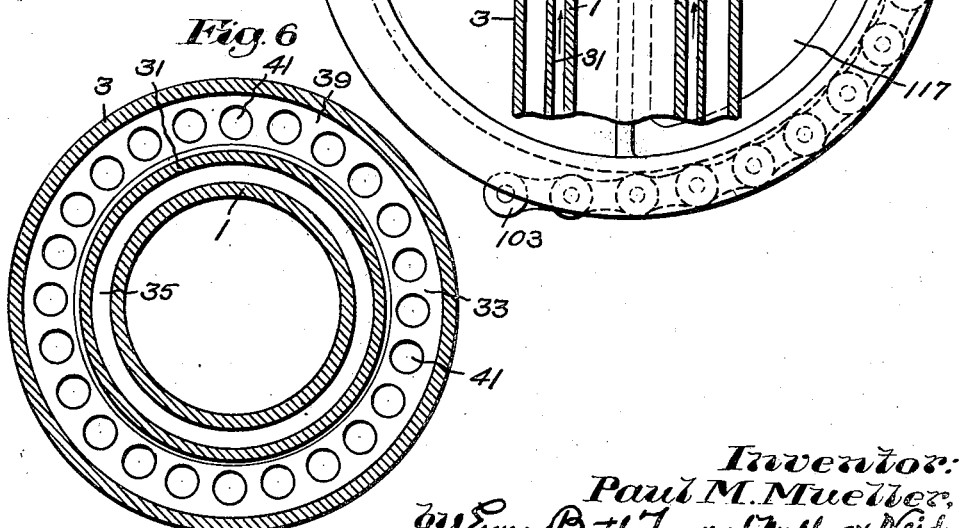

Figs. 4 and 5 are sections on the lines 4—4 and 5—5 of Fig. 1, with parts omitted;

Fig. 6 is a section on the line 6—6 of Fig. 3; and

Fig. 7 is an elevation, with parts omitted, showing the mold and associated mechanism for operating it.

Referring to the drawings, the mold illustrated comprises a tube 1 of circular cross-section, the interior walls of which tube define the lateral walls of an elongated mold chamber. The tube is preferably a drawn seamless copper tube. The size of such tube may vary of course to suit the dimensions of the billet to be cast. Among such sizes employed in practice is mentioned a tube about 80 inches long having an internal diameter of 7 inches and a wall thickness of 0.5 inch.

For supporting the tube 1 is shown an outer tube 3, of suitable material such as mild steel. Closing the lower end of the annular space between the tubes 1 and 3, as viewed in Fig. 1, is shown a ring-like member 5, this member having a flange 7 inserted in the lower end of the tube 1 and welded thereto about the periphery of the flange, as shown at 8 in Fig. 3. Closing the upper end of the annular space between the tubes 1 and 3 is shown a ring-like member 9 having an annular interiorly screw-threaded flange 11 into which the upper end of the tube 3 is screw-threaded.

Figure 2:
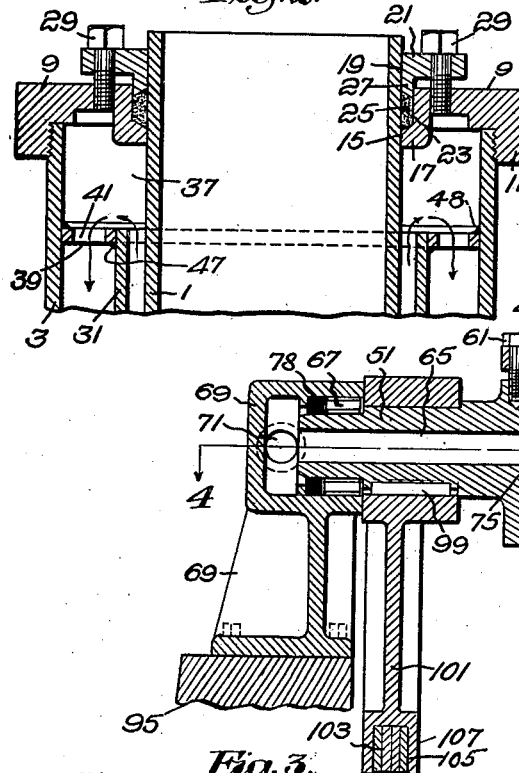
Figs. 2 and 3 are enlarged views of the upper and lower ends, respectively, of the mold according to Fig. 1.

The ring-like member 5 at the lower end of the mold is shown as provided with a downwardly extending annular flange 13 into which the lower end of the tube 1 is screw-threaded, so as removably but fixedly to secure to each other the lower ends of the tubes 1 and 3. The upper end of the tube 1 slidably extends through the opening 15 (Fig. 2) in a downwardly projecting flange 17 of the ring-like member 9, and through the opening 19 of the packing gland 21. The flange 17 and the adjacent portions of the ring-like member 9 are formed to provide an annular recess 23 surrounding the tube 1, in which recess is a packing ring 25 surrounding the tube and positioned between the bottom of the recess and the lower end of an annular flange 27 on the packing gland 21. By screwing down the stud bolts 29 securing the gland to the member 9 the packing ring may be compressed between the bottom of the recess and the lower end of the flange 27 to make a fluid tight joint between the ring-like member 9 and the tube 1. As the lower end of the tube 1 is fixedly secured to the tube 3, the former may expand longitudinally relative to the latter when molten metal is poured into the mold chamber.

As shown, a tube 31 is positioned concentrically with the tubes 1 and 3 in the space between those tubes, so as to divide that space into an outer annular chamber 33 and an inner annular chamber 35. The ends of the tube 31 are shown as somewhat spaced from the ring-like members 5 and 9 to provide annular chambers 37 adjacent the lower and upper ends, respectively, of the mold chamber, these annular chambers 37 serving to place the annular chambers 33 and 35 in fluid communication. For supporting the tube 31 suitable spacing rings 39 may be positioned between that tube and the tube 3, these spacing rings being provided with perforations 41 for passage of cooling water.

Intermediate the length of the mold the tube 3 is shown as provided with an opening 43 and a diametrically opposite opening 45. In the annular chamber 33 is shown an imperforate ring 46 arranged in inclined position so that in the position of parts shown by Fig. 1 the edge of the ring at one side thereof is above the opening 43 while at its diametrically opposite side the edge is below the opening 45. The ring 46 serves to divide the annular chamber 33 into two contiguous longitudinally arranged sections, so that cooling water entered through the opening 43 may flow downwardly through the lower section into the lower annular chamber 37, from which latter it may flow into the lower end of the annular chamber 35 and upwardly through the latter into the upper annular chamber 37, hence into the upper end of the upper section of the annular chamber 33 and discharge from the lower end of that section through the opening 45 in the tube 3.

It will be noted that the cooling fluid in the lower section of the annular chamber 35 is in heat conducting relation to the fluid in that portion of the annular chamber 33 which it surrounds and that the fractions of the fluid respectively in the two chambers flow in counter directions. It has been found that this will act to make the temperature of the fluid in the chamber 33 more uniform throughout the length of the billet, even if sufficient metal is poured into the mold chamber substantially to fill it, than otherwise would be the case in absence of such relation of heat conduction and fluid flow, and thus the arrangement secures a better cooling of the billet. Generally considered, best results will be secured in these respects by making the lower section of the annular chamber 33 as long as feasible with the fluid inlet close to its upper end, and in extreme cases the lower section could well be the length of the billet being cast so as to secure counter flow of fluid the entire length of the billet, it being understood that the length of the billet is governed by the amount of metal poured into the mold chamber.

The construction so far described may be fabricated by placing the ring 46 and the several rings 39 over the tube 31 and welding the rings about their inner peripheries to the tube, as indicated at 47. Then the tube 31 with these rings may be slipped into the tube 3, and the outer peripheries of the rings 39 at the ends of the tube 31 may be welded, as indicated at 48, to the interior walls of the tube 3 from the ends of the latter. The bottom ring-like member 5 may then be inserted in the lower end of the tube 3 and the periphery of the flange 7 of that member be welded to the tube, as hereinbefore mentioned, to make a fluid tight joint between them. The upper ring-like member 9 may then be screwed on the tube 3, after which the tube 1 may be inserted through the opening in this ring and its lower end screwed into the ring-like member 5, and finally the packing ring 25 and packing gland 21 may be placed in position and the stud bolts 29 inserted and screwed up to compress the packing ring. The outer peripheral edge of the ring 46 is preferably beveled slidably to fit the interior peripheral walls of the tube 3, that edge not being secured to those walls so as to permit the mold to be assembled in the way just described, any slight amount of leakage that may occur past the ring 46 being immaterial. It will also be understood that the intermediate ring 39 similarly slidably fits the interior walls of the tube 3 so as to permit assembly of the mold parts.

As illustrated, the mold is supported on oppositely extending trunnions 49 and 51 positioned above the center of gravity of the mold, as viewed in Fig. 1, so that the latter normally tends to assume a vertical position. These trunnions are carried by a ring-like member 53 formed with a frusto-conical opening 55, the smaller end of said opening being at the bottom of the member 53, as viewed in Fig. 1. Surrounding the tube 3, and secured thereto as by welding, is a sleeve 57 having a frusto-conical exterior wall fitting the frusto-conical wall of the opening 55. The sleeve 57 at its upper end is provided with an annular flange 59 having spaced perforations through which extend stud bolts 61 tapped into the upper side of the member 53 for securing the mold to that member and for making a fluid tight joint between the contacting frusto-conical surfaces. The sleeve 57, as shown, is provided with hooks 63, for attachment to a chain or the like of a hoist, so that when the stud bolts 61 are removed the mold with the sleeve 57 may be drawn from the member 53. It will be understood that molds of different diameter, each carrying sleeves 57 of the same outer diameter, may be readily substituted for each other, so that when a different diameter billet is required the appropriate mold may be inserted in the ring-like member 53.

As illustrated, the trunnions 49 and 51 are provided with longitudinally extending axially disposed passages 65 opening on the ends of the trunnions. The ends of the trunnions are shown as rotatably mounted in roller bearings 67 carried by bearing brackets 69. These bearing brackets are provided with openings 71 for attachment of pipe connections 73 (Figs. 4 and 7) for conducting cooling water to the passage 65 of the trunnion 51 and discharging it from the passage 65 of the trunnion 49, the sleeve 57 being provided with openings 75 placing the passages 65 in communication with the adjacent opening 43 or 45. For insuring proper alignment of the passages 65 in the trunnions with the openings 75 of the sleeve 57 the latter is provided exteriorly thereof with a longitudinally extending key 76 which fits a cooperating keyway 77 formed in the interior surface of the opening 55 in the member 53. Each bearing bracket is shown as provided with a ring packing 78, of suitable construction, for packing the joint between the bearing bracket and trunnion, so as to prevent leakage of water from the interior of the bracket to the adjacent roller bearing.

The mold chamber defined by the tube 1 in the present embodiment of the invention is, as shown, closed at its lower end by a removable bit or stopper 79. This stopper is of cylindrical cross-section and may be slid into the end of the tube 1 through the opening 81 in the lower ring-like member 5. The bit may be secured against falling out, when the parts are in the position shown by Fig. 1, by one or more retaining pins 83 removably inserted through aligned openings 85 and 87 in the tube 1 and flange 13 of the ring-like member 5, respectively. When a new tube 1 is inserted to replace a worn tube the opening 87 may serve as a jig for drilling the opening 85 in the tube. Conveniently the pin 83 is provided with a downturned portion 89 permitting it to be readily removed, while the bit 79 may be conveniently provided with an outwardly extending shank 91 having a head 93 serving as means for grasping the bit by any convenient instrumentality for handling it.

As shown by Figs. 1 and 7, the bearing brackets 69 are mounted on pillars 95 extending upwardly from the bottom of a pit 97. On the trunnion 51 is non-rotatably secured, as by means of a key 99 (Fig. 1), a quadrant sheave 101 for a chain 103, the latter being received in the peripheral groove 105 formed in the rim 107 of the sheave. As illustrated, the end 109 (Fig. 5) of the chain is secured to the adjacent end of the rim of the quadrant sheave, while its other end is attached at 111 (Fig. 7) to the end of the piston rod 113 of a piston 114 reciprocally mounted in a cylinder 115. Suitable connections (not shown) under the control of a manually operated valve are provided for admitting compressed air to and from the opposite ends of the cylinder 115 for reciprocating the piston 114 and piston rod 113. When the piston rod is in the position shown by Fig. 7 the mold will be in its vertical position shown by that figure, and when the piston rod is moved to the right to the opposite end of its stroke the chain 103 acting on the quadrant sheave will tilt the mold into its dotted line horizontal position. Conveniently, the web 116, which connects the rim to the hub of the quadrant sheave, is cut away, as shown at 117, at the right hand side of its vertical axis as viewed in Fig. 5, to cause the uncut away portion at the opposite side of said axis to overbalance the weight of the chain and act to keep the chain under tension when the piston 114 is moving to the left, as viewed in Fig. 7, and when the mold is in its vertical position.

In alignment with the mold when the latter is in its horizontal position is a cylinder 118 having a piston rod 119 operated by the reciprocatory piston 121 within said cylinder. By means of suitable connections under the control of a manually operated valve, compressed air may be admitted to and exhausted from opposite ends of the cylinder for reciprocating the piston rod, which latter has a head 123 adapted to enter the open end of the mold chamber and push therefrom the billet, the latter being indicated by dotted lines at B in Fig. 7, onto a suitable conveyer schematically indicated by the row of rolls 125. Preparatory to pushing the billet out of the mold the retaining pin 83 for the bit or stopper 79 may be removed so that the billet when operated upon by the head 123 of the piston rod 119 will push the bit from the mold. After the billet is pushed out of the mold the piston rod 119 may be retracted and the bit 79 replaced together with the bit retaining pin 83, and then the mold may be swung to its vertical position by causing the piston rod 113 to move into its position shown by Fig. 7, causing the mold to move again into its vertical position so that another billet may be cast.

It will be understood that, within the scope of the appended claims, wide deviations may be made from the form of the invention shown without departing from the spirit of said invention.

I claim:

1. Molding apparatus having, in combination, an axially elongated mold, a mold support comprising a member having a recess for removably receiving said mold at an intermediate portion of its length only, means for supporting said member for tilting transversely of the axis of said mold, and cooling fluid conducting passages in said mold and mold support adapted to be placed in communication when said mold is received by said recess, said mold and mold support having cooperating means for making such communication fluid tight when said mold is so received.

2. Molding apparatus having, in combination, an axially elongated mold, a mold support comprising a member adapted to surround said mold at an intermediate portion of its length only, said member having an opening through which said mold is adapted to be removably inserted endwise to cause said member to so surround it, means for supporting said member for tilting about an axis transversely of the axis of said mold at said intermediate portion, and cooling fluid conducting inlet and outlet passages in said mold and mold support adapted respectively to be placed in communication when said mold is inserted in said opening, the walls of said opening and the portion of said mold received thereby having cooperating means for making such communication fluid tight when said mold is so inserted.

3. Molding apparatus having, in combination, a mold having a passage for cooling fluid, a port for said passage opening on the exterior of said mold, a mold support having a passage for said fluid, which passage has a port opening on the exterior of said support, and means for detachably securing said mold to said mold support with said ports in registry.

4. Molding apparatus having, in combination, a mold support comprising a body mounted for tilting movement, said body having an opening provided with an interior wall surface inclined toward one end of said opening, a mold removably received in said opening, which mold has an exterior surface so inclined as to fit against said inclined surface of said opening, said mold and mold support having registering cooling fluid conducting passages opening on said inclined surfaces thereof, and means for forcing said surfaces into contact for making a fluid tight joint between them.

5. Molding apparatus having, in combination, a mold support comprising a body mounted for tilting movement, an opening in said body, a mold removably received in said opening, cooling fluid conducting passages in said mold and mold support, which passages open on said mold and mold support interiorly of said opening for communication with each other, and means making a fluid tight joint between said mold and the surrounding portion of said mold support.

6. Molding apparatus having, in combination, a mold support mounted for tilting movement, which support is formed with a through opening of circular transverse cross-section, a mold extending through said opening, said mold and mold support being each formed with a cooling fluid conducting passage opening on the exterior thereof interiorly of said opening in said mold support for communication with each other; the walls of said opening in said mold support, and the exterior of said mold interiorly of said opening, having a fluid tight circumferential fit with each other at portions thereof between each end of said opening in said mold support and the places of opening thereinto of said passages.

7. Molding apparatus having, in combination, a mold supoprt comprising a body formed with a through opening and oppositely extending trunnions, the latter for mounting said support for tilting movement, said opening having an interior frusto-conical surface, a cooling fluid conducting passage in each trunnion opening interiorly of said opening on said surface, a mold removably extending through said opening and having an exterior frusto-conical surface fitting said interior frusto-conical surface of said opening, cooling fluid conducting passages in said mold opening exteriorly thereof on said exterior frusto-conical surface of the mold for communication with the passages in said trunnions and means for forcing said frusto-conical surfaces into fluid tight contact.

8. A mold having, in combination, means forming an elongated mold chamber having walls surrounded by a cooling fluid conducting passage extending from adjacent one to the other end of said chamber, oppositely disposed trunnions for the mold positioned intermediate the length of said chamber, one of which trunnions has a passage for supply and the other a passage for discharge of cooling fluid, means forming a passage connecting the passage in one of said trunnions to one end of said cooling fluid conducting passage for the mold chamber walls and another passage for connecting the passage in the other of said trunnions to the opposite end of said cooling fluid conducting passage for the mold chamber walls, said passages which connect the passages in the trunnions to opposite ends, respectively, of the cooling fluid conducting passage for the mold chamber walls surrounding said cooling fluid conducting passage in heat transfer relation to it and collectively extending from adjacent one end of the mold chamber to adjacent the other.

9. A mold according to claim 8 in which those passages which connect the passages in the trunnions to opposite ends, respectively, of the cooling fluid conducting passage for the mold chamber walls are contiguous annular chambers surrounding said cooling fluid conducting passage.

10. A mold according to claim 8 in which the cooling fluid conducting passage for the mold chamber walls is an annular passage surrounding said walls from adjacent one end of the mold chamber to the other, and the passages which connect the passages in the trunnions to opposite ends of said annular cooling fluid conducting passage are contiguous annular chambers surrounding said annular cooling fluid conducting passage.

11. A mold having, in combination, a wall defining the lateral sides of an elongated mold chamber, a body surrounding such chamber wall in spaced relation thereto from adjacent one end of the mold chamber to the other, a partition wall surrounding said chamber wall between the latter and the interior walls of said body in spaced relation to each, which partition wall extends from adjacent one end of the mold chamber to adjacent the other, and fluid conducting connections for entering cooling fluid into the space at the outer side of said partition wall and for discharging such fluid from said space into the space at the opposite side of said partition wall adjacent one end of the mold chamber and for discharging it from the last mentioned space adjacent the opposite end of the mold chamber.

12. A mold according to claim 11 in which the fluid conducting connections cause the cooling fluid at the outer side of the partition wall to flow counter to the cooling fluid at the opposite side of said wall.

13. A mold having, in combination, a wall defining the lateral sides of an elongated mold chamber, a body surrounding such chamber wall in spaced relation thereto from adjacent one end of the mold chamber to the other, a longitudinally extending partition wall surrounding said chamber wall between the latter and the interior walls of said body in spaced relation to each, which partition wall extends from adjacent one end of the mold chamber to adjacent the other, a transversely extending partition wall dividing the space at the outer side of said longitudinally extending partition wall into two longitudinally arranged sections, means establishing fluid communication between those ends of said sections and the space at the inner side of said longitudinally extending partition wall which are adjacent the ends of the mold chamber, and means for entering cooling fluid into one of said sections adjacent said transversely extending partition wall and for discharging such fluid from the other of said sections adjacent said transversely extending partition wall.

14. A mold having, in combination, a wall defining the lateral sides of a normally closed bottom elongated vertical mold chamber, which wall also defines the inner side of a water jacket which surrounds said wall throughout substantially the length of the mold chamber, a water jacket surrounding the first mentioned water jacket in heat transfer relation therewith, and connections for passing cooling water through the last mentioned water jacket and discharging it into the first mentioned water jacket adjacent one end of the mold chamber for flow through said first mentioned jacket counter to the flow through said last mentioned jacket.

15. A mold having, in combination, means forming the lateral walls of a mold chamber with a water jacket surrounding said walls throughout substantially the length of the mold chamber, a second water jacket surrounding the first mentioned water jacket in heat transfer relation therewith, and connections for entering cooling water into said second water jacket and discharging it therefrom into said first mentioned water jacket for flow of such water through said jackets in series.

16. A mold having, in combination, an inner tube defining the lateral walls of an elongated mold chamber, a supporting tube surrounding the first mentioned tube in laterally spaced relation thereto, means adjacent each end of the mold chamber for closing the ends of the space between said tubes, a third tube, the latter being positioned between the two first mentioned tubes in laterally spaced relation to them and extending at least approximately the length of the mold chamber, means dividing the space between said third tube and said supporting tube into two contiguous longitudinally extending annular sections, means establishing fluid communication between the end portions of the space between said third tube and inner tube and the corresponding ends of said sections, means for entering cooling fluid into one of said sections adjacent its opposite end and discharging it from the other of said sections adjacent its corresponding end.

17. A mold having, in combination, an inner tube defining the lateral walls of an elongated mold chamber, a supporting tube surrounding said inner tube in laterally spaced relation thereto, ring-like members adjacent each end of the mold chamber closing the space between said tubes, to one of which members said inner tube is removably rigidly attached and through the other of which it slidably extends, a third tube, the latter being positioned between said two first mentioned tubes in laterally spaced relation to each with the interior of said third tube communicating with its exterior adjacent opposite ends of the mold chamber, an inclined partition ring at an intermediate portion of the length of the mold chamber dividing the space between said third tube and supporting tube into two longitudinally arranged sections, an inlet for cooling fluid to one of said sections adjacent said partition ring at one side thereof and an outlet for cooling fluid from the other of said sections adjacent said partition ring.

18. A mold having, in combination, an elongated inner tube of metal of relatively high heat conductivity such as copper, a removable stopper for one end of said tube so that the interior of said tube may form a mold chamber for molten metal poured into the tube through its end opposite said stopper, an outer tube surrounding the first tube with their walls in spaced relation, a bottom ring-like member connecting one end of one of said tubes to the adjacent end of the other and closing the space between them at those ends, a top ring-like member carried by the opposite end of the outer tube, through which latter ring-like member the adjacent end of the inner tube slidably extends, means packing the joint between said inner tube and said top ring-like member, an intermediate tube carried by said outer tube interiorly of the latter, which intermediate tube surrounds the inner tube in spaced relation to the walls of both the inner and outer tubes, each end of said intermediate tube being spaced from the adjacent ring-like member to form a space at each end of the tube, into each of which spaces the adjacent end of each of the spaces between said tube and the inner and outer tubes opens, spaced openings in the outer tube for entrance and exit, respectively, of cooling fluid into and out of the space between said outer and intermediate tubes, means carried by said intermediate tube exteriorly thereof dividing the space between that tube and the outer tube into two sections disposed longitudinally of said tubes, said means being so disposed as to cause one of said openings in said outer tube to communicate with one of said sections and the other opening to communicate with the other of said sections.

PAUL M. MUELLER.